(No Model.)
E. H. BENNERS.
GREASE CUP.
No. 431,867. Patented July 8, 1890.
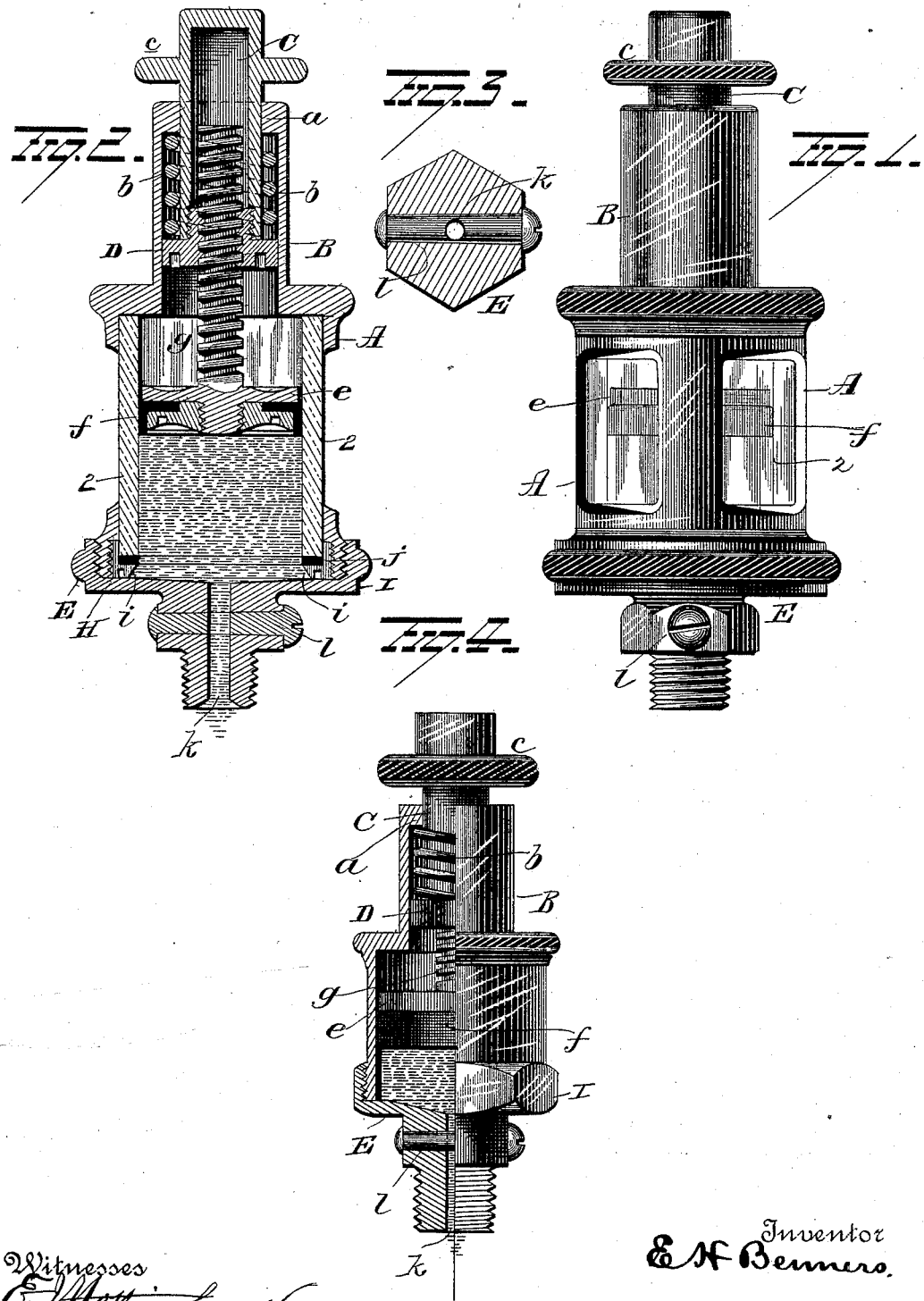
Witnesses
E. Nottingham
V. E. Hodges
Inventor
E. H. Benners.
By his Attorney
H. A. Seymour

UNITED STATES PATENT OFFICE.

EDWIN H. BENNERS, OF ELIZABETH, NEW JERSEY.

GREASE-CUP.

SPECIFICATION forming part of Letters Patent No. 431,867, dated July 8, 1890.

Application filed March 25, 1890. Serial No. 345,286. (No model.)

*To all whom it may concern:*

Be it known that I, EDWIN H. BENNERS, of Elizabeth, in the county of Union and State of New Jersey, have invented certain new and useful Improvements in Grease-Cups; and I do hereby declare the following to be a full, clear, and exact description of the invention, such as will enable others skilled in the art to which it appertains to make and use the same.

My invention relates to an improvement in grease-cups, and is designed more particularly as an improvement on the device shown and described in application, Serial No. 331,993, filed November 29, 1889, the object of the present improvement being to simplify in some particulars the construction disclosed in the application above referred to.

With this end in view my invention consists in the parts and combination of parts, as will be more fully described, and pointed out in the claims.

In the accompanying drawings, Figure 1 is a view in elevation of a device embodying my invention. Fig. 2 is a view in section of same. Fig. 3 is a view in section through the base of the cup and valve, and Fig. 4 is a view in section showing some of the features applied to a metal cup.

A represents the barrel or body of the cup, which in Figs. 1 and 2 has open or skeleton sides and is lined with the cylindrical glass-container 2, in which the grease or other lubricating compound is packed. The barrel or body A is open at the bottom, and is provided centrally at its top with a cylindrical dome B, which latter, for the sake of economy, is made integral with the body or barrel. This dome is open throughout its entire length and communicates with the interior of the body, and is provided at its upper end with an internal flange *a*, which latter forms an abutment or stop for the spring *b*, which latter operates to hold the plunger with a yielding pressure on the grease within the body or barrel.

C is the sleeve closed at its upper end and provided near said upper end with a milled wheel *c* for turning the sleeve when necessary to adjust the plunger, and which also limits the downward movement of the sleeve. This sleeve is provided at its lower end with internal threads for the reception of the external and internal threaded cylindrical nut D. The lower section of this nut D is greater in diameter than the diameter of the sleeve C and snugly fits within the dome B, and consequently the sleeve is free, so far as this nut is concerned, to move freely within the dome B. As the sleeve is smaller than the nut and the nut fits snugly within the dome, it follows that there is a space between the sleeve and dome, and it is within this space that the spring *b*, before referred to, is located. This spring bears at one end against flange *a* and at the other against the nut D, and consequently tends to hold the sleeve well down in the dome, the milled wheel limiting the depression of the sleeve and the nut limiting its outward movement. In assembling these parts the sleeve is passed through the outer end of the dome and the barrel inverted. The spring is then placed in position around the sleeve and secured by the nut D. The parts are now in position for the plunger, which is substantially the same as the plunger disclosed in the application above referred to. Briefly stated, it consists of a head *e*, having a leather packing *f* for preventing the grease from escaping upwardly above the plunger-head, and a screw-threaded stem *g*, the threads on the latter constructed to engage the internal threads on nut D.

To fill the body or barrel, the plunger is screwed up until the head thereof is adjacent to the top of the barrel or body. The grease is then packed in from the under side and the base E screwed in place. The head of the plunger is now resting solidly on the grease, and by turning on the milled wheel on the sleeve the latter, together with nut D, is rotated and consequently moved upwardly against the pressure of the spring. As soon as the pressure on the under side of the head is relieved by the escape of grease the spring forces the sleeve downwardly until the hand-wheel strikes the top of the dome. By again turning the wheel and elevating the sleeve on the stem *g* and compressing the spring the head is again yieldingly forced in contact with the grease and operates to gradually force the latter through the escape-orifice in the bottom of the cup. By this arrangement of parts considerable space is saved over the construction disclosed in my former application, and consequently the device takes up less room and can be manufactured at less cost.

The lower open end of the body or barrel is screw-threaded internally for the reception of the metallic washer H, which latter firmly locks the glass lining in place. This washer is provided at its lower end with an inwardly-projecting flange $i$ for the reception of a rubber or cork gasket or ring $j$, on which the glass lining rests. By this arrangement the glass is centered, any irregularity in shape thereof compensated for, and the escape of grease at this point absolutely prevented.

The base I of the cup is screwed onto the body and is provided centrally with the grease-escape orifice $k$ and with the valve $l$. The head of this valve is shaped like a screw-head and is provided with a central groove for the reception of a screw-driver or other similar device for turning same. Such a construction will prevent its being turned by mischievous or unauthorized persons. To prevent the withdrawal of the valve, I simply upset the smaller end thereof, which effectually prevents any longitudinal movement.

In the modified form shown in Fig. 3 I have simply dispensed altogether with the glass lining and the parts for holding same in place and made the body or barrel wholly of metal.

Having fully described my invention, what I claim as new, and desire to secure by Letters Patent, is—

1. The combination, with a body or barrel, and a dome thereon having an inwardly-projecting flange at its upper end, of a sleeve projecting within the dome, and internal and external threaded nut secured to the lower end of the sleeve, a spring encircling the sleeve and bearing at one end against the flange and at the opposite end against the nut, and a plunger having a screw-threaded stem, the latter engaging the internal threads on the nut and forming with the sleeve an extensible stem, substantially as set forth.

2. The combination, with a skeleton barrel or body and a glass lining, of a washer removably secured to the body or barrel below the glass lining and provided with an inwardly-projecting flange, forming a seat for said lining, and a packing-ring interposed between the end of the glass lining and the flange, substantially as set forth.

In testimony whereof I have signed this specification in the presence of two subscribing witnesses.

EDWIN H. BENNERS.

Witnesses:
S. G. NOTTINGHAM,
V. E. HODGES.